(12) United States Patent
Ma

(10) Patent No.: US 11,506,180 B2
(45) Date of Patent: Nov. 22, 2022

(54) ENCLOSURE WITH VORTEX-INDUCED VIBRATION SUPPRESSION FUNCTION AND METHOD FOR SUPPRESSING VORTEX-INDUCED VIBRATION

(71) Applicant: BEIJING GOLDWIND SCIENCE & CREATION WINDPOWER EQUIPMENT CO., LTD., Beijing (CN)

(72) Inventor: Shengjun Ma, Beijing (CN)

(73) Assignee: BEIJING GOLDWIND SCIENCE & CREATION WINDPOWER EQUIPMENT CO.. LTD., Beijing (CN)

( * ) Notice: Subject to any disclaimer, the term of this patent is extended or adjusted under 35 U.S.C. 154(b) by 1111 days.

(21) Appl. No.: 16/083,499

(22) PCT Filed: Feb. 24, 2018

(86) PCT No.: PCT/CN2018/077101
§ 371 (c)(1),
(2) Date: Sep. 8, 2018

(87) PCT Pub. No.: WO2019/047484
PCT Pub. Date: Mar. 14, 2019

(65) Prior Publication Data
US 2021/0095641 A1    Apr. 1, 2021

(30) Foreign Application Priority Data

Sep. 11, 2017   (CN) .......................... 201710813609.4

(51) Int. Cl.
*F03D 13/20*    (2016.01)
*F03D 80/00*    (2016.01)
(Continued)

(52) U.S. Cl.
CPC ............. *F03D 80/00* (2016.05); *F03D 13/20* (2016.05); *F16F 15/023* (2013.01); *E04H 12/08* (2013.01);
(Continued)

(58) Field of Classification Search
CPC ........ F03D 80/00; F03D 13/20; F16F 15/023; F16F 2222/126; F16F 2230/22;
(Continued)

(56) References Cited

U.S. PATENT DOCUMENTS 6,676,122 B1 *  1/2004  Wobben ..................... F03D 9/25
                                          290/55
7,365,447 B2 *  4/2008  Yoshida ..................... F15D 1/12
                                          290/55
(Continued)

FOREIGN PATENT DOCUMENTS

AU    2009213058 A1    3/2010
CN       1705822 A    12/2005
(Continued)

OTHER PUBLICATIONS

International Search Report and Written Opinion in corresponding PCT Application No. PCT/CN2018/077101, dated May 24, 2018, 11 pages.
(Continued)

*Primary Examiner* — Brian P Wolcott
*Assistant Examiner* — Joshua R Beebe
(74) *Attorney, Agent, or Firm* — Bayes PLLC

(57) ABSTRACT

An enclosure with a vortex-induced vibration suppression function and a method for suppressing vortex-induced vibration are provided. The enclosure is provided with suction through holes extending through a peripheral wall thereof, the suction through holes are distributed in a circumferential direction of the enclosure. The enclosure is further provided (Continued)

with a suction apparatus, and the suction apparatus can perform suctioning to the suction through holes from outside to inside, to restrain a boundary layer at an outer surface of the enclosure from being detached from the outer surface. By the suctioning, the boundary layer can be "adsorbed" on the outer surface of the tower, thereby restraining or directly preventing the boundary layer from being detached from the outer surface of the tower, and reducing or eliminating the cause of the vertex-induced vibration.

17 Claims, 12 Drawing Sheets

(51) Int. Cl.
  *F16F 15/023* (2006.01)
  *E04H 12/08* (2006.01)
  *E04H 12/12* (2006.01)

(52) U.S. Cl.
  CPC .......... *E04H 12/12* (2013.01); *F05B 2220/30* (2013.01); *F05B 2260/96* (2013.01); *F16F 2222/126* (2013.01); *F16F 2230/22* (2013.01); *F16F 2230/36* (2013.01)

(58) Field of Classification Search
  CPC ...... F16F 2230/36; E04H 12/08; E04H 12/12; F05B 2220/30; F05B 2260/96
  See application file for complete search history.

(56) References Cited

U.S. PATENT DOCUMENTS

| | | | |
|---|---|---|---|
| 2006/0245928 A1 | 11/2006 | Herbst | |
| 2006/0290140 A1 | 12/2006 | Yoshida | |
| 2009/0019791 A1 | 1/2009 | Llorente Gonzalez | |
| 2009/0060748 A1 | 3/2009 | Landa et al. | |
| 2010/0266382 A1 | 10/2010 | Campe et al. | |
| 2011/0103950 A1 | 5/2011 | Pesetsky et al. | |
| 2011/0229322 A1* | 9/2011 | Tadayon | F03D 80/40 416/169 R |
| 2012/0074711 A1 | 3/2012 | Sato et al. | |
| 2014/0167419 A1* | 6/2014 | Quek | F03D 1/06 290/55 |
| 2014/0346781 A1* | 11/2014 | Airoldi | F03D 1/00 290/55 |

FOREIGN PATENT DOCUMENTS

| | | | |
|---|---|---|---|
| CN | 103216395 A | 7/2013 | |
| CN | 105587471 A | 5/2016 | |
| CN | 205744309 U | 11/2016 | |
| CN | 107387335 A | 11/2017 | |
| CN | 107605666 A | 1/2018 | |
| EP | 1736663 A2 | 12/2006 | |
| EP | 2161446 A1 * | 3/2010 | ............ F03D 13/20 |
| EP | 2161446 A1 | 3/2010 | |
| EP | 2320076 A2 * | 5/2011 | ........... F03D 1/0675 |
| EP | 2320076 A2 | 5/2011 | |
| WO | 2006106162 A1 | 10/2006 | |

OTHER PUBLICATIONS

European Search Report in corresponding European Application No. 18765346.4, dated Mar. 28, 2019, 8 pages.

* cited by examiner

ENCLOSURE WITH VORTEX-INDUCED VIBRATION SUPPRESSION FUNCTION AND METHOD FOR SUPPRESSING VORTEX-INDUCED VIBRATION

This application is the national phase of International Application No. PCT/CN2018/077101, titled "ENCLOSURE WITH VORTEX-INDUCED VIBRATION SUPPRESSION FUNCTION AND METHOD FOR SUPPRESSING VORTEX-INDUCED VIBRATION", filed on Feb. 24, 2018, which claims the benefit of priority to Chinese Patent Application No. 201710813609.4, titled "ENCLOSURE WITH VORTEX-INDUCED VIBRATION SUPPRESSION FUNCTION AND METHOD FOR SUPPRESSING VORTEX-INDUCED VIBRATION", filed with the State Intellectual Property Office of People's Republic of China on Sep. 11, 2017, the entire disclosures thereof are incorporated herein by reference.

FIELD

The present application relates to the technical field of enclosures, and in particular to an enclosure with a vortex-induced vibration suppression function and a method for suppressing vortex-induced vibration.

BACKGROUND

Reference is made to FIG. 1-1, which is a schematic view showing the composition of a wind power generation device.

The base of the wind power generation device is a tower 10, which carries and encloses the whole machine. Taking a tower 10 having a circular section as an example, the tower 10 may be a steel tower or a combination of a steel tower and a concrete tower. The tower 10 carries a nacelle 30, a generator, and an impeller 20 of the wind power generation device. A wind power generator set composed of the impeller 20 and the generator is used to acquire wind energy and convert the wind energy into electric energy. The converted electric energy is transmitted through a power transmission cable 40 or a power transmission busbar. The power transmission cable 40 shown in the figure is led out from the nacelle 30 and its position is limited by a cable retaining ring, the cable retaining ring is arranged at the top of the tower 10 and is fixed to a cable retaining ring fixing plate 50. The power transmission cable 40 then passes a saddle bracket 60 and is suspended along an inner wall of the tower 100 to a converter cabinet 70. A tower door 80 is further provided at a lower end of the tower 10.

The electric energy obtained by the conversion is controlled by a switch cabinet of the wind power generator set and is transmitted by means of the power transmission cable 40 or the power transmission busbar to a converter (in the converter cabinet 70) for realizing the electric power conversion, and after the electric energy is treated by the converter, the electric energy meeting the requirements of power grid access rule can be obtained. Therefore, the tower 10 of the wind power generation device can be regarded as a tower pole for wind power generation, and mainly plays a supporting role in the wind power generation device.

Moreover, the tower 10 bears structural wind loads generated by the nacelle 30, the impeller 20 and the generator, or the downwind vibrations and crosswind vibrations resulted from the structural wind loads, i.e., issues of wind-induced structural vibration.

Reference is made to FIG. 1-2, which is a schematic view showing the tower being hoisted in segments.

The tower 10 is generally installed in segments currently, and as shown in FIG. 1-2, as an example, the tower segments includes sequentially, from the bottom to the top, a first tower segment 11, a second tower segment 12, a third tower segment 13, a fourth tower segment 14 and a fifth tower segment 15. In the process of installing the wind power generation device, the first tower segment 11 is installed on a foundation 90 of the tower 10 first, and then other tower segments are hoisted individually, and after the tower segments are connected one another, the top of the tower 10 (the fifth tower segment 15 in FIG. 1-2) is connected to a yaw system of the nacelle 30, and the nacelle 30 is docked with the power generator, and the power generator (or a gear box) is docked with the impeller 20.

The specific hoisting process is as follows.

Before hoisting the tower 10, a foundation annulus of the foundation 90 configured to be connected to the first tower segment 11 is cleaned first, and multiple bolts (such as 120 bolts) are placed at an inner ring of the foundation annulus after threaded portions of the bolts are greased, and meanwhile, a control cabinet of the wind power generation device is hoisted into the foundation annulus.

A hoisting appliance is mounted at an upper end of the first tower segment 11, here the upper end of the first tower segment 11 is hoisted up by a main hoist, and at the same time, a hoisting appliance is also mounted at a lower end of the first tower segment 11, and here the lower end of the first tower segment is hoisted up by an auxiliary hoist for the tower. The two hoists hoist the first tower segment at the same time. When the altitude of the first tower segment 11 is greater than the maximum diameter of the first tower segment 11, the main hoist hoists up the upper end of the first tower segment 11, and the auxiliary hoist stops working. When the first tower segment 11 is hoisted to be perpendicular to the ground, the auxiliary hoist is removed, and the hoisting appliance at the lower end of the first tower segment 11 is removed.

After a flange surface of the first tower segment 11 is connected, the bolts are passed through the flange surface from bottom to top, and nuts are installed and are tightened by means of an electric wrench. The nuts are tightened by at least 3 times (till the hoisting procedure of the entire wind power generation device is finished, tower connecting nuts are then tightened by means of a torque wrench to reach a required torque value).

The hoisting processes of the rest tower segments are the same as that of the first tower segment 11, and after the hoisting of the uppermost tower segment finishes, it is prepared to hoist the nacelle.

The above installation procedures of docking and connection are all carried out under conditions where local winds in a small regional environment of a wind farm are unpredictable. Therefore, in the process of hoisting and installation, gusts of varying strengths or continuous light wind are often encountered. As described above, these gusts or continuous wind may induce vibrations of the tower, destroy the stability of the enclosure, and endanger the on-site people and equipment, and delay the installation period. For example, after the fourth tower segment 14 is hoisted, the fourth tower segment 14 may vibrate, such that the fifth tower segment 15 cannot be aligned; and even, the fastened bolts may break under the action of vibrations, thereby compromising security.

At present, the project safety requirements for the hoisting process of the wind power industry clearly state that hoisting of the blade group is prohibited when the wind speed is greater than 6 m/s; hoisting of the nacelle is strictly prohibited when the wind speed is greater than 8 m/s, and hoisting of the tower is strictly prohibited when the wind speed is greater than 10 m/s. Accordingly, the on-site hoisting progress and installation period are obviously limited by the wind conditions in the local region. For the construction of wind farms at high-altitude and high mountain regions, the project duration is even more apt to be adversely affected.

Reference is made to FIGS. 2 to 3-6, FIG. 2 is a schematic view showing the structure of a tower having a certain vibration suppression function in the conventional technology; FIGS. 3-1 to 3-6 are schematic views showing the relationship between vortex shedding from a cylinder (bypass flow detachment) and six intervals of Reynolds number. The six intervals of the Reynolds number (Re) are respectively Re<5, 5<Re<15, 40<Re<150, 150<Re<$3 \times 10^5$, $3 \times 10^5$<Re<$3 \times 10^6$, and Re>$3 \times 10^6$ from FIGS. 3-1 to 3-6.

According to different flowing patterns of airflow around object structures, the structures are divided into a bluff body and a streamline body such as an aircraft wing or a sail.

When Re<5, the fluid flow is attached to the entire surface of the cylinder, i.e., the fluid flow is not separated.

When 5<Re<40, the flow is still symmetrical, but flow separation occurs, and two symmetrically arranged stable vortexes are formed at a leeward side, and the vortexes are stretched outwards as the Reynolds number increases, resulting in malformation of the vortexes.

When 40<Re<150, starting from the Reynolds number Re=40, the vortexes will alternately shed from a rear side of the surface of the cylinder and flow into the fluid near the back of the cylinder to form a shear layer. The unstable shear layer soon rolls up into vortexes and flows downstream, forming the Karman vortex street, i.e., the vortex-induced vibration. The vortex shedding here is regular and periodic.

When 150<Re<300, it is a transition period from laminar flow to turbulent flow, here periodic vortex shedding is covered by irregular turbulent flow.

When 300<Re<$3 \times 10^5$, it is referred to as a subcritical region. The cylinder wake is mainly presented as a turbulent wake after the separation. The vortex shedding begins to be irregular, and the period of the vortex shedding frequency can be roughly defined, however, the disturbing force in vortex shedding will no longer be symmetrical, but be random.

When $3 \times 10^6$<Re<$3 \times 10^6$, it is referred to as a supercritical region. The vortex shedding point moves backwards, and the vortex street cannot be identified, and becomes a completely non-periodic vortex.

When $3 \times 10^6$<Re, it is referred to as a transcritical region, the wake at the rear side of the cylinder is very disordered, but also presents a regular vortex shedding.

When a uniform airflow flows by (sweeps past, flows around) a bluff body (cylindrical body), the periodic vortex shedding generated at the back of the cross section of the cylinder may produce a periodically changing action force, i.e., the vortex-induced force, on a structure (the contact surface of the tower). A lower end of the tower structure around which the airflow flows and the underground foundation constitute a single free end vibration system (i.e., an upper end of the tower is submerged in the airflow, and a lowermost end of the tower is fixed on the foundation). When the vortex shedding frequency consists with a certain order natural frequency of the tower structure, the periodic vortex-induced force (unbalanced force) applied on the tower surface will cause a response of vortex-induced vibration of the tower system structure.

The condition that the vortex shedding frequency is equal to the natural frequency of the tower of the structure system and its foundation vibration system can be met only at a certain wind speed. However, the tower and its foundation vibration system will have a certain feedback effect on the vortex shedding, to allow the frequency of the vortex shedding to be "captured" by the vibration frequency of the tower and its foundation vibration system in a certain wind speed range, to allow the frequency of the vortex shedding to not change as the wind speed changes in this wind speed range, and this phenomenon is referred to as locking, and the locking will extend the wind speed range in which the tower structure is induced by vortexes to resonate.

The tower height of modem large-scale MW level wind power generator sets can reach 60 m to 100 m. Main components such as a main frame, a sub-frame, a hub and blades (i.e., the impeller 20) are mounted at the top of the tower 10. When the wind power generator set is in operation, in addition to the gravity generated by the parts at the top of the tower 10 and the dynamic loads generated by the rotation of the wind wheel, the tower 10 is also subjected to the action of the natural wind, including two modes of action, i.e., the action in downwind direction and the action in crosswind direction. When the wind blows the impeller to rotate, it will apply bending moments and forces onto the tower. The bending moments and forces generated in downwind direction are the main reasons for the damage of the tower 10. The vortexes generated when the wind bypasses the tower 10 may also cause lateral vibrations that may cause resonance of the tower 10 and damage the tower 10 accordingly.

When the wind blows over the tower 10, pairs of antisymmetrical vortexes arranged alternately and rotating in opposite directions, i.e., Karman vortexes, are generated at left and right sides of the wake. The vortexes shed from the tower 10 at a certain frequency, to cause the tower 10 to produce lateral vibration perpendicular to the wind direction, also referred to as wind-induced lateral vibration, i.e., vortex-induced vibration. When the shedding frequency of the vortexes is close to the natural frequency of the tower, the tower 10 is apt to resonate and therefore be damaged.

In FIG. 2, a helix line 10a (or a helix plate) is wound around an outer wall of the tower 10, to suppress vortex shedding occurred on the surface of the tower 10. The helix line 10a (or the helix plate) has different lateral vibration suppression effects when being arranged at different pitches. The increase of the height of the helix line 10a facilitates breaking the periodicity of the vortex street shedding. Vortex street generation and shedding are more irregular, which facilitates the suppression of vortex-induced vibrations. Moreover, the noises and resistances generated behind and in front of the tower are also gradually increased, and the amplitude of the pitching vibration along the wind direction may be increased.

The above technical solution has the following technical issues.

The wind speed of the airflow will change, and if the helix line 10a (or the helix plate) is machined to have its feature parameters (pitch of screws, height) changed according to the change of the wind speed of the airflow, the corresponding manufacturing cost and maintenance cost will be increased significantly.

The coverage rate of the helix line 10a (or the helix plate) on the tower surface will affect the lateral vibration suppression effect. When the coverage rate reaches (or exceeds) 50%, the effect of suppressing lateral vibrations is the best. However, in this case, the serious adverse effects of the wind-induced noise caused by the helix line 10a (or the helix plate) and the airflow on the living beings in the natural environment is not permitted by the ecological regulations.

The mounted helix line 10a (or the helix plate) is only used in the hoisting stage, which has a reduced significance and loses a lot. Considering the long-term operation and use, it is difficult for the helix line to adapt to the changes of wind speed and cope with different wind speeds due to the requirements of installation cost and environmental protection, i.e., it is hard for the helix line to function at any different wind speeds.

In view of this, an urgent technical issue to be addressed by the person skilled in the art is to improve the situation that the installation of the wind power generation device is restricted by regional wind conditions.

SUMMARY

In order to address the above technical issues, an enclosure with a vortex-induced vibration suppression function and a method for suppressing vortex-induced vibration are provided according to the present application, which can suppress the causes of vortex-induced vibration and improve the situation that the installation and use of the wind power generation device are restricted by regional wind conditions.

An enclosure with a vortex-induced vibration suppression function is provided according to the present application. The enclosure is provided with suction through holes extending through a peripheral wall of the enclosure, and the suction through holes are distributed in a circumferential direction of the enclosure. The enclosure is further provided with a suction apparatus, and the suction apparatus is configured to perform suctioning to the suction through holes from outside to inside, to restrain an airflow boundary layer at an outer surface of the enclosure from being detached from the outer surface.

A method for suppressing vortex-induced vibration of an enclosure is further provided according to the present application, which includes providing suction through holes extending through a peripheral wall of the enclosure in a circumferential direction of the enclosure; and performing suctioning to the suction through holes from outside to inside, to restrain a boundary layer at an outer surface of the enclosure from being detached from the outer surface.

When the incoming flow at the upwind side flows around the tower, the boundary layer will form periodic vortex shedding at two sides rearward of the tower, that is, the bypass flow detachment phenomenon. It is also the cause of vortex-induced vibration. In this solution, suctioning from the several suction through holes is performed such that the boundary layer can be "adsorbed" on the outer surface of the tower, thereby inhibiting or directly preventing the boundary layer from being detached from the outer surface of the tower, and thus reducing or eliminating the cause of vortex-induced vibration and achieving the object of suppressing vortex-induced vibration. Obviously, the suction through holes are distributed in a circumferential direction, thus regardless of the wind direction of the incoming flow at the upwind side, there are always corresponding suction through holes available for suctioning at the corresponding position of the bypass flow detachment.

In addition, the suction intensity may be adjusted any time according to the vibration state in suctioning, thus achieving a higher flexibility without requiring to pay a higher cost. Moreover, compared with the noise generated when the incoming flow at the upwind side comes into contact with the helix line in the background, the noise generated in performing suctioning to the suction through holes may be obviously significantly smaller, and can meet the requirements of ecological regulations. Furthermore, the suctioning method can always realize its suppression function to the vortex-induced vibration in both the hoisting process or the operation process of the wind power generation set; and when the suctioned airflow is discharged to the inside of the tower, it may perform heat exchanging and thus cooling the inside of the tower.

BRIEF DESCRIPTION OF THE DRAWINGS

FIG. 1-2 is a schematic view showing a tower being hoisted in segments;

FIG. 2 is a schematic view showing the structure of a tower having a certain vibration suppression function;

FIGS. 3-1 to 3-6 are schematic views showing the relationship between vortex shedding from a cylinder (bypass flow detachment) and six intervals of Reynolds number respectively:

FIG. 4 is a schematic view showing the structure of an embodiment of a tower with a vortex-induced vibration suppression function according to the present application:

FIG. 5 is a schematic expanded view showing an upper part, provided with suction through holes, of the tower in FIG. 4:

FIG. 6 is a schematic view showing the relationship between the Strouhal number and the Reynolds number at an outer surface of the tower:

Figure 1:
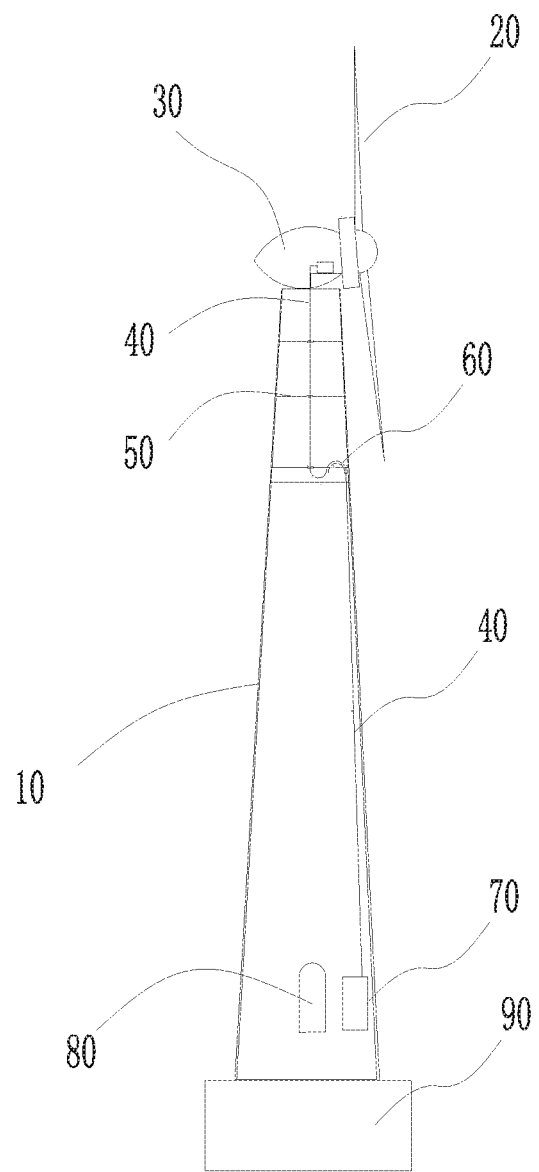
FIG. 1-1 is a schematic view showing the composition of a wind power generation device.
Figures 1, 2:
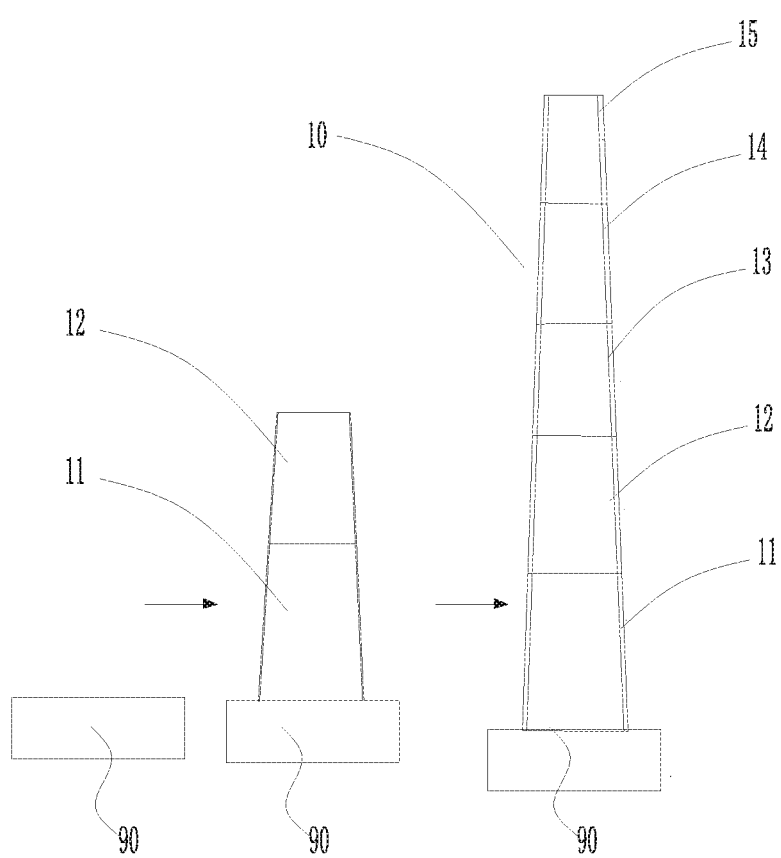
Figure 2:
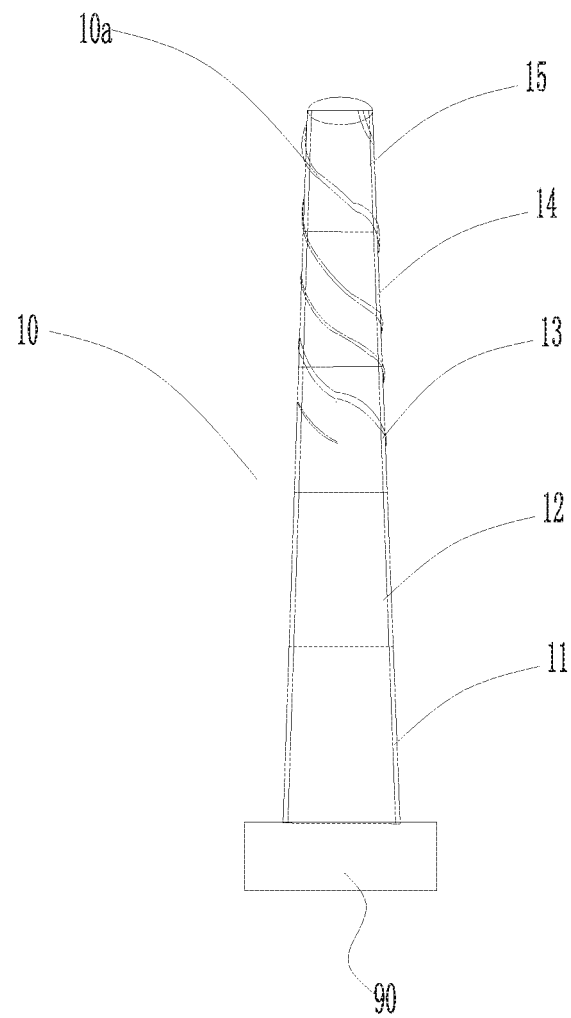
Figure 14:
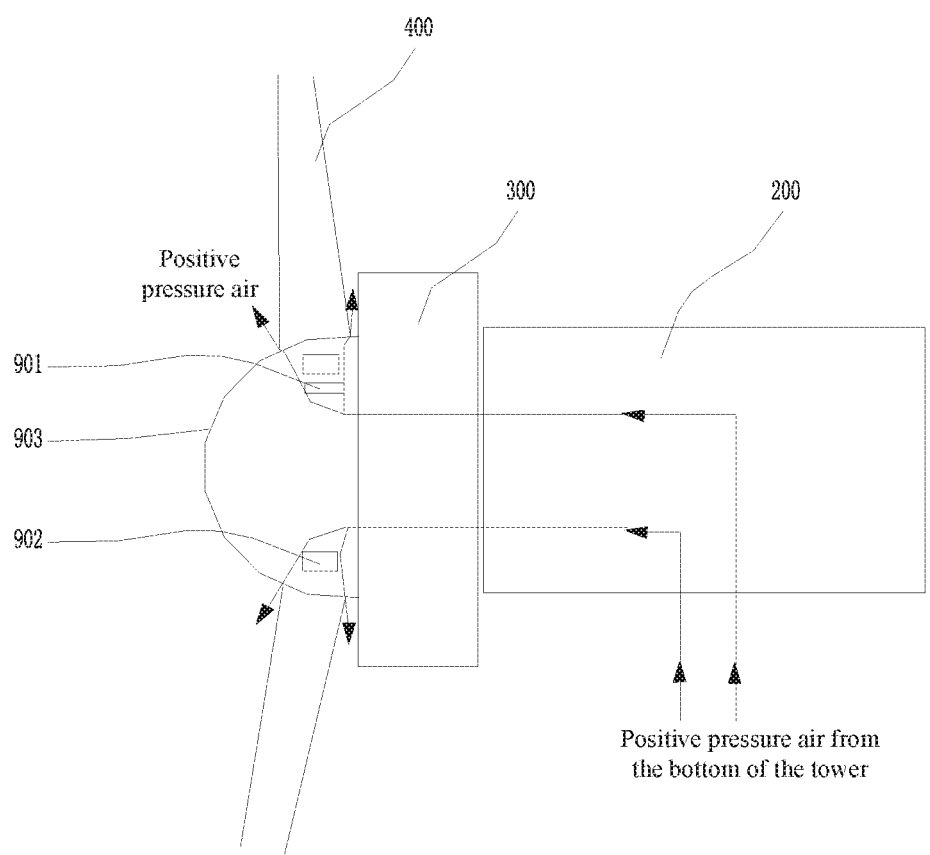
FIG. 14 is a schematic view showing the airflow path of the discharged airflow in FIG. 4 after rising to the top of the tower.

Reference numerals in FIGS. 1-1 to 14 are explained as follows:

| | | | |
|---|---|---|---|
| 10 | tower, | 11 | first tower segment, |
| 12 | second tower segment, | 13 | third tower segment, |
| 14 | fourth tower segment, | 15 | fifth tower segment, |
| 10a | helix line, | 20 | impeller, |

-continued

| | Reference numerals in FIGS. 1-1 to 14 are explained as follows: | | |
|---|---|---|---|
| 30 | nacelle, | 40 | power transmission cable, |
| 50 | retaining ring fixing plate, | 60 | saddle bracket, |
| 70 | converter cabinet, | 80 | tower door, |
| 90 | foundation; | | |
| 100 | tower, | 100a | suction through hole, |
| 100b | temperature sensing channel; | | |
| 200 | nacelle, | 300 | generator, |
| 400 | impeller; | | |
| 500a | suction port, | 500b | air discharge port, |
| 501 | air suction machine, | 502 | transport pipeline, |
| 503 | air discharge manifold, | 504 | suction manifold, |
| 505 | electrically-controlled valve; | | |
| 600 | tower foundation; | | |
| 701 | shell, | 702 | partition, |
| 703 | air filtration segment, | 704 | suction chamber; |
| 801 | thermal insulation layer, | 802 | temperature sensing element, |
| 802a | lead end, | 803 | vibration monitoring device; |
| 901 | pitch servo motor, | 902 | flow guiding hood, |
| 903 | electric control cabinet. | | |

DETAILED DESCRIPTION OF EMBODIMENTS

For enabling the person skilled in the art to better understand the technical solutions of the present application, the present application is described further in detail hereinafter with reference to the drawings and embodiments.

Figures 1, 3:
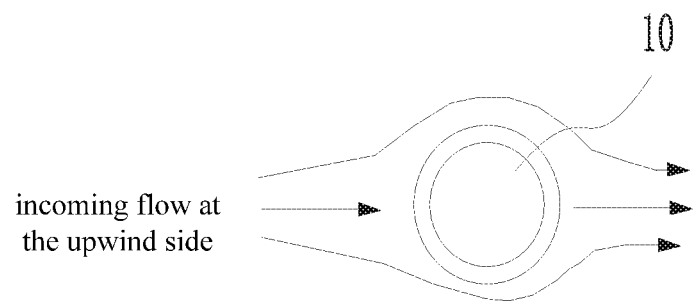
Figures 2, 3:
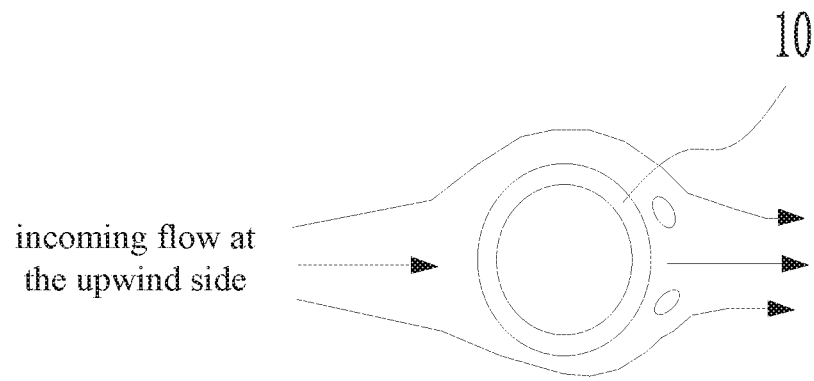
Figure 3:
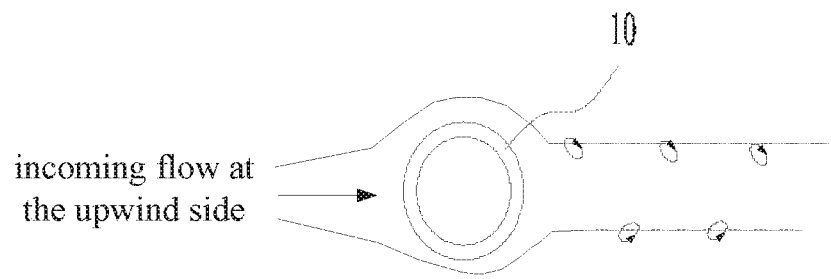
Figures 3, 4:
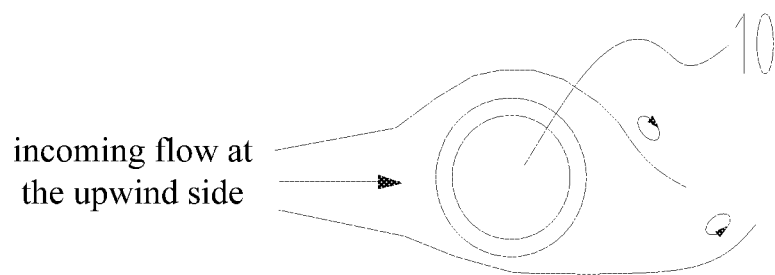
Figures 3, 4, 5:
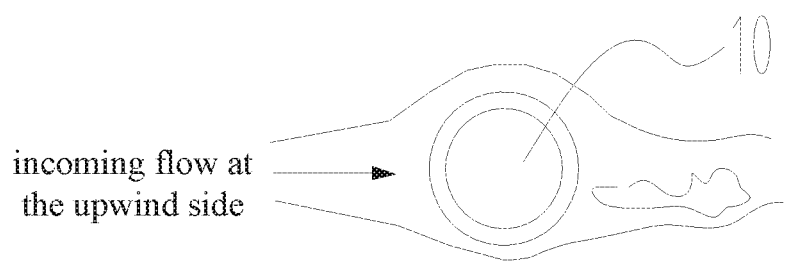

Referring to FIG. 4, FIG. 4 is a schematic view showing the structure of an embodiment of a tower with a vortex-induced vibration suppression function according to the present application. FIG. 5 is a schematic expanded view showing an upper part, provided with suction through holes, of the tower in FIG. 4, that is, an annular upper part of a tower 100 is expanded to be in a bar shape for ease of illustration. Correspondingly, a method for suppressing vortex-induced vibration of an enclosure is further provided according to an embodiment of the present application.

As shown in FIG. 4, the tower 100 is arranged on a tower foundation 600, and components such as a nacelle 200, a generator 300 and an impeller 400 are mounted at the top of the tower 100. As shown in FIG. 5, in this embodiment, the upper part of the tower 100 is provided with several suction through holes 100a extending through a peripheral wall of the tower 100, and the several suction through holes 100a are distributed in a circumferential direction of the tower 100, that is, distributed around the tower 100. In addition, a suction apparatus is further provided, which can perform suction from outside to inside to the suction through holes 100a. Here, "from outside to inside" is not intended to define the position of the suction apparatus but to define the direction of suction, that is, when the suction is performed, the airflow flows from the outside to the inside, and thus, the suction apparatus can be placed inside the tower 100, and of course, the suction device can also be placed outside the tower 100. When performing suction to the suction through holes 100a, since the suction through holes 100a extend through the peripheral wall of the tower 100, the boundary layer airflow at an outer surface of the tower 100 can be suctioned, in this way, the boundary layer airflow at the outer surface can be restricted from being detached from the outer surface. The boundary layer referred here is a terminology in heat transfer science and fluid mechanics, and is a thin layer at the surface of a solid and is a fluid (gas or liquid).

It can be known from the description of the background that, when the incoming flow at the upwind side (multiphase flow) flows around the tower 100, the boundary layer will form periodic vortex shedding on two sides rearward of the tower 100, that is, the bypass flow detachment phenomenon, and it is also the cause of vortex-induced vibration. In this solution, by suctioning from the several suction through holes 100a, the boundary layer can be "adsorbed" on the outer surface of the tower 100, thereby inhibiting or directly preventing the boundary layer from being detached from the outer surface of the tower 100, that is, reducing or eliminating the causes of vortex-induced vibration and achieving the object of suppressing vortex-induced vibration. This is equivalent to "absorbing" the vortex-induced vibration by suction. Obviously, the suction through holes 100a are distributed in a circumferential direction, thus regardless of the wind direction of the incoming flow at the upwind side, there are always corresponding suction through holes 100a available for suctioning at the corresponding position of the bypass flow detachment.

In principle, when the vortex-induced resonance of the tower 100 structure occurs, the vortex-induced force (i.e., unbalanced force) acting on the outer surface of the tower 100 structure is approximately a simple harmonic force F (t):

$$F(t)=F_0 \sin \omega t \quad (1)$$

in the formula: ω(Re,St) is the frequency of the vortex shedding, and integrally, ωt is a variable;

$$Re = \frac{\rho u d}{\mu},$$

Re is the Reynolds number and is a dimensionless number;
$F_0$ is the amplitude of vertex-induced force, $F_0=(\rho U^2/2)$ CD:
ρ is the density of the incoming flow at the upwind side of the tower 100;
U is a wind speed of the incoming flow at the upwind side of the tower 100 the aerodynamic coefficient is also called a wind load form factor, it is a ratio of a pressure (or a suction) formed by the wind on the surface of the engineering structure to a theoretical wind pressure calculated according to the wind speed of the incoming flow; and it reflects the distribution of a stable wind pressure on the engineering structure and the surface of the building, and varies with the airflow direction, and the shape, scale, shielding conditions of the building.

C is an aerodynamic coefficient of the section of the tower 100 structure;

D and d are feature dimensions of a space structure formed by an obstacle facing the fluid when the fluid bypasses the obstacle and flows around the obstacle, and are generic terms in the heat transfer field and heat transfer science. In this embodiment, D and d refer to the feature dimensions of a contact surface, in contact with the fluid (here the fluid is airflow), of the enclosure (here it means the shape of the outer surface of the tower), and it generally takes the width of the structure perpendicular to the wind direction, i.e., the outer diameter of the tower 100 at the corresponding height, that is, the outer diameter of the tower 100 at the height of the segment where the suction through holes 100a are distributed.

μ is a viscous coefficient of the incoming flow at the upwind side.

The variation of amplitude of lateral vibration of the tower 100 structure caused by a vortex-induced force is:

$$A(t) = \frac{\pi}{\delta}\frac{1}{K}(\rho U^2/2)CD\sin\omega t \quad (2)$$

in the formula: K is the stiffness of the structural system of the tower 100 (which may include the nacelle 200);

δ is a logarithmic decrement (about 0.05).

When the wind speed of the incoming flow at the upwind side reaches a certain suitable value and continues to act for a certain period of time, vortex-induced resonance of the tower 100 structure may occur. The amplitude A of the vibration here is:

$$A = \frac{\pi}{\delta}\frac{\rho C f^2}{2K(St)}D^3 \quad (3)$$

It can be seen that when the section size of the structure is fixed, the amplitude of the vortex-induced resonance can be reduced by increasing the damping, such as reducing the aerodynamic coefficient C, reducing the density ρ of the incoming flow at the upwind side.

The above formula:

$$St = \frac{fD}{U},$$

i.e., the Strouhal number, and the definition of the Strouhal number illustrates the relationship between a vortex shedding frequency, a wind speed, and a cylinder diameter.

In the formula: f is the vortex shedding frequency, Hz;

U is the wind speed of the incoming flow at the upwind side of the tower 100; and D is an outer diameter of a portion, at an average height of the segment where the suction through holes 100a are distributed, of the tower 100.

In this embodiment, D refers to the outer diameter of the tower 100 at different heights. The outer diameter may change. When the incoming flow at the upwind side flows around the tower 100 not in a horizontal direction but at a certain inclination angle, the path of the flow bypassing the periphery of the tower 100 is approximately elliptical, like the description of the above aerodynamic configuration. In this case, the feature dimension D is just an equivalent diameter (a terminology in the heat transfer science, which is the diameter of an imaginary circular cross-section, i.e., the diameter of a circular cross-section converted according to the perimeter of a non-circular cross-section) of the aerodynamic configuration ellipse. In this case, the boundary that is wetted by the fluid or in contact with the fluid becomes more streamlined, and be away from being blunted. Viewed from the vibration form, vortex-induced resonance is a vibration with limited amplitude and having dual characteristics of being self-excited and forced.

Figures 3, 4, 5, 6:
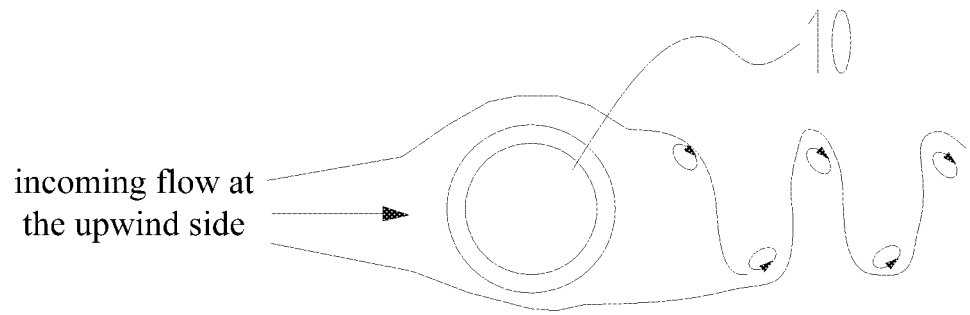
Figure 4:
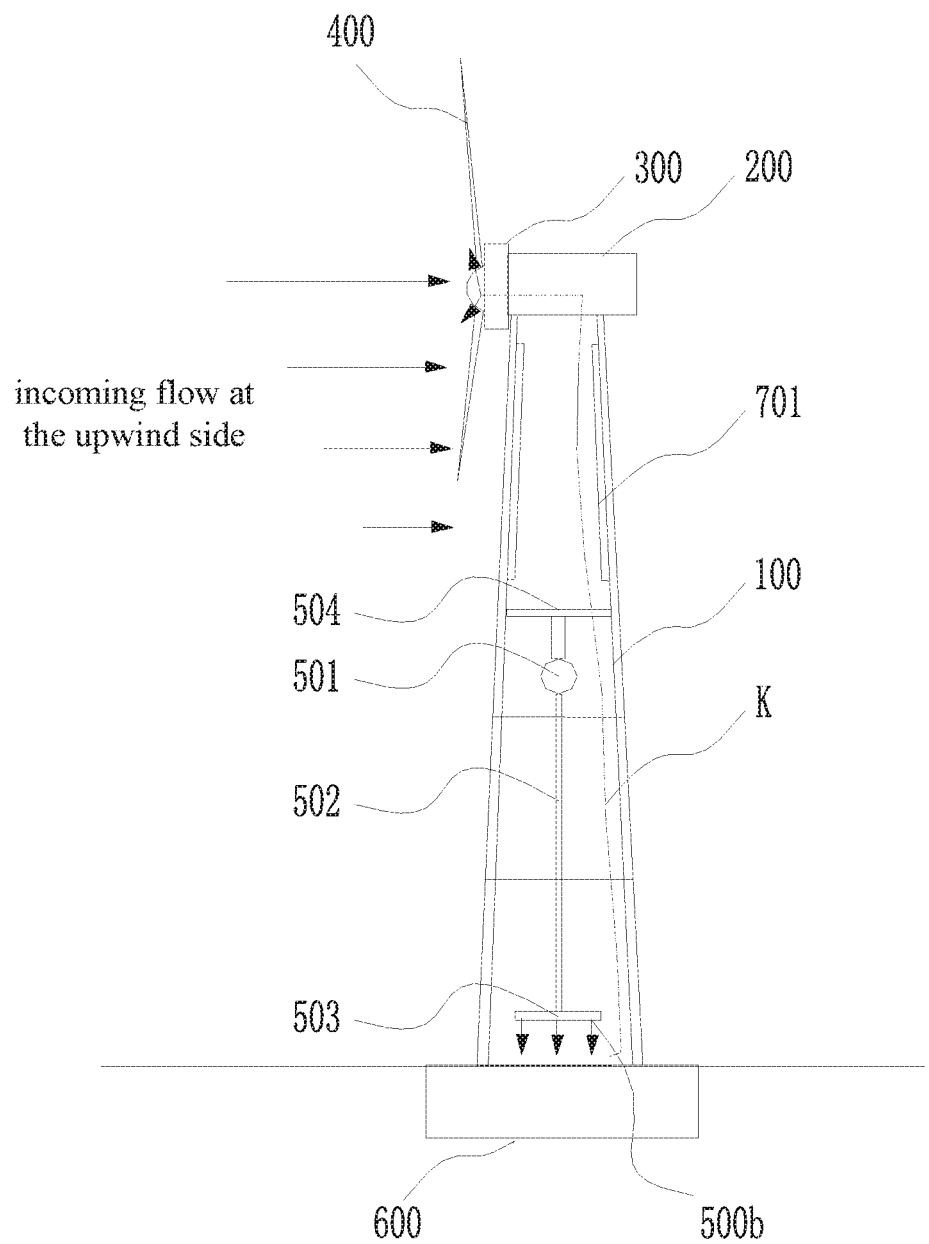
Figure 5:
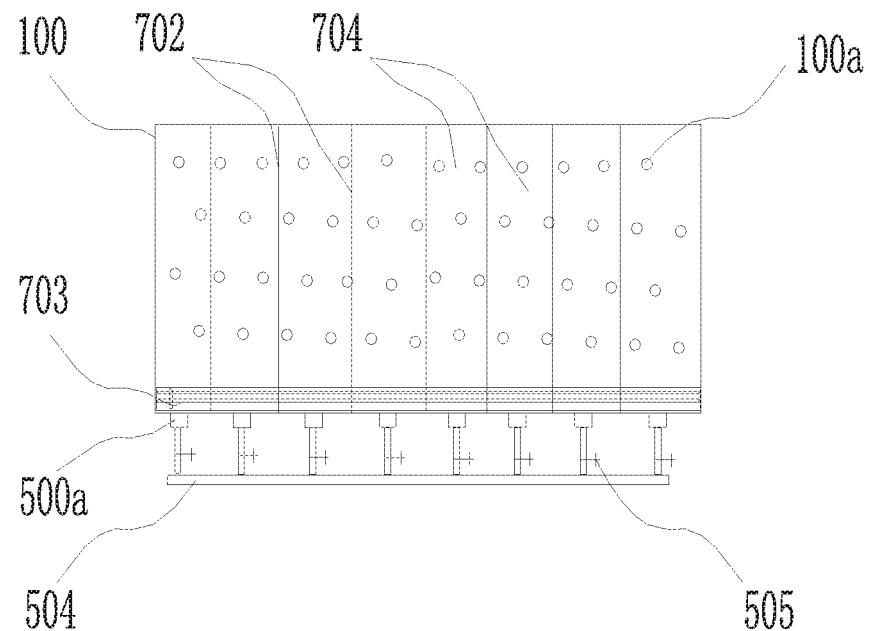
Figure 6:
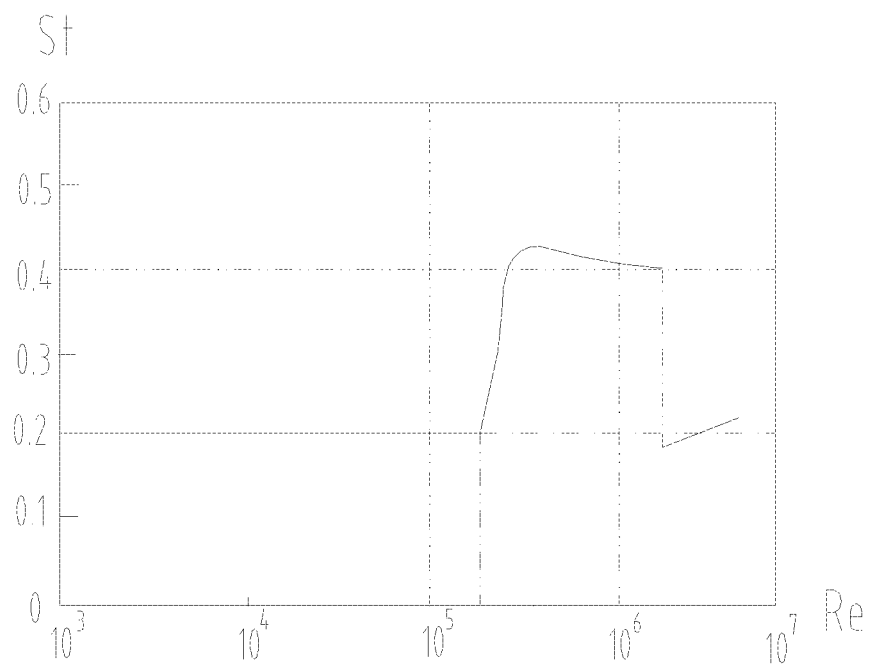

The Strouhal number can be obtained according to the Reynolds number. Reference may be made to FIG. 6 for the relationship between the Strouhal number with the Reynolds number. FIG. 6 is a schematic view showing the relationship between the Strouhal number and the Reynolds number at the outer surface of the tower, and the horizontal axis represents the Reynolds number, and the vertical axis represents the Strouhal number. Before the Reynolds number reaches $2\times10^5$, the Strouhal number is a constant 0.20; after that, as the Reynolds number increases, the Strouhal number first jumps to 0.30, then increases to 0.43, and then when the Reynolds number equals to $2\times10^6$, the Strouhal number drops to 0.2 again. Therefore, each of the Strouhal number, D and U is a parameter that can be obtained, and f can also be calculated according to the formula of the Strouhal number, and accordingly, the amplitude A can also be calculated.

When the incoming flow at the upwind side flows around the tower 100, due to the suction effect, the boundary layer airflow on the outer surface of the tower 100 may be suctioned towards the inside of the tower 100 at the position where the suction through holes 100a are provided, to keep the boundary layer in a laminar flow state, avoid transition of the boundary layer, so as to reduce the surface friction force, and make the airflow flow be attached to the outer surface of the tower 100. The suction through holes 100a and the outer surface of the tower 100 are in smooth transition, which reduces the aerodynamic coefficient (C) of the airflow flowing around the tower 100, and according to the formula (3), the amplitude (A) of the vortex-induced resonance can be reduced and thus the vortex-induced vibrations can be suppressed.

With continued reference to FIGS. 4 and 5, for facilitating the suction to the suction through holes 100a, a shell 701 is further provided in the enclosure. The shell 701 and an inner surface of the region, provided with the suction through holes 100a, of the enclosure enclose a closed suction cavity. In FIG. 4, the suction through holes 100a are provided only in the upper part of the tower 100, correspondingly, the shell 701 cooperates with the inner surface of the upper part of the tower 100 to form a closed annular suction cavity. The suction apparatus suctions the suction cavity, to achieve suction to the suction through holes 100a from the outside to the inside.

It can be seen that when the closed suction cavity is provided, the suction apparatus simply suctions the annular suction cavity, suction to all of the suction through holes 100a in the circumferential direction of the tower 100 may just be realized, thus the suction can be realized more easily. Of course, it is also feasible not to provide the suction cavity. For example, the suction apparatus may have multiple suction ports 500a in cooperation with the suction through holes 100a, or one suction port 500a corresponding to the suction through holes 100a within a certain region.

An air filtration segment 703 may be provided between the suction cavity and the suction ports 500a of the suction apparatus. Specifically, as shown in FIG. 5, an annular air filtration segment 703 is provided at the bottom of the suction cavity, and the suction ports 500a of the suction apparatus are arranged at a lower side of the annular air filtration segment 703, that is, located at the bottom of the shell 701. The suction apparatus suctions the outside airflow inwards, the outside airflow may carry dust, rain, and etc. The air filtration segment 703 may filter the airflow that is suctioned in, to avoid damaging the suction apparatus. When the suctioned airflow is discharged to the inside of the tower 100, the cleanliness of the discharged airflow can be improved as well, to avoid polluting the internal air that is bad for the operation of workers or may damage the internal components of the tower 100.

Figure 7:
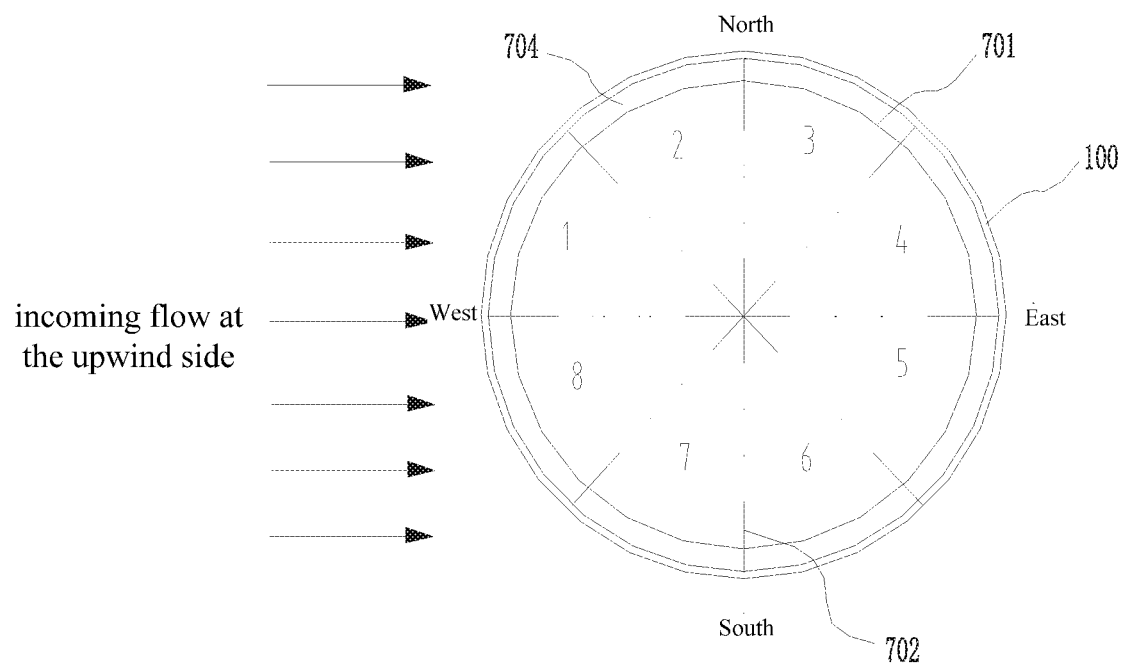
FIG. 7 is a top view of the top of the tower in FIG. 4, showing divided suction chambers.

Further, with continued reference to FIG. 5 and in conjunction with FIG. 7, FIG. 7 is a top view of the top of the tower 100 in FIG. 4, showing divided suction chambers 704.

Several partitions 702 are provided in the suction cavity. The partitions 702 divide the suction cavity into several circumferentially distributed suction chambers 704. As described above, when the incoming flow at the upwind side flows around the tower 100, a bypass flow detachment phenomenon may occur. In FIG. 7, the incoming flow at the upwind side is from due west, thus the bypass flow detachment phenomenon occurs at the rear side of the tower 100 at positions approximately eastward from the due north and eastward from the due south of the tower (the positions 110 to 130 degrees clockwise or counterclockwise to the position where the tower 100 directly faces the incoming flow at the upwind side), which correspond to the suction chambers 704 as indicated by serial numbers 3 and 6 in FIG. 7. In FIG. 7, the suction cavity is equally divided in the circumferential direction into eight suction chambers 704 by the partitions 702. In this embodiment, it is preferable that the suction apparatus only suctions the suction chamber 704 corresponding to the position of the bypass flow detachment, that is, in FIG. 7, only the two suction chambers 704 indicated by the serial number 3 and 6 are suctioned and the rest suction chambers 704 are not suctioned.

It should be known that the bypass flow detachment is just an important cause for forming the Karman vortex street and resulting in the vortex-induced vibration, so simply suctioning the suction chamber 704 at the position of the bypass flow detachment may just weaken or prevent the detachment of the boundary layer at this position, and inhibit the occurrence of the Karman vortex street, thereby inhibiting or directly preventing the vortex-induced vibration. Compared with the method of suctioning the entire annular suction cavity, it is obvious that the method of only suctioning the position of the bypass flow detachment is more targeted and can reduce energy consumption, that is, to perform directional absorbing to the incoming flow (multiphase flow) at the upwind side.

As shown in FIG. 5, the suction apparatus may have several suction ports 500a in one-to-one correspondence with the several suction chambers 704, and a switch valve is provided between each of the suction ports 500a and the corresponding suction chamber 704. When the suction chamber 704 corresponding to the position of the bypass flow detachment is suctioned, the switch valves corresponding to the rest suction chambers 704 are turned off. The switch valve may specifically be an electrically-controlled valve 505, and in this case, a controller may further be provided. The controller may obtain the position of the bypass flow detachment, thereby controlling the electronically-controlled valve 505 corresponding to the position of the bypass flow detachment to be switched on, and controlling the rest electrically-controlled valves 505 to be switched off, to achieve the automatic control. Of course, as a redundant or alternative solution to the electrical control, manual control is also feasible.

Each suction chamber 704 corresponds to one suction port 500a, that is the suction chambers 704 and the suction ports 500a are in one-to-one correspondence, thus, the suction force of the suction apparatus can be more assured, and in a case that the corresponding switch valves are provided, only one suction apparatus is required to be equipped. It should be known that it is also feasible to equip each suction chamber 704 with one suction apparatus, however, it is obvious that the arrangement of one suction apparatus corresponding to all of the switch valves has a cost advantage.

In the case that the suction apparatus is provided with the suction ports 500a corresponding to the multiple suction chambers 704, a suction manifold 504 may further be provided. In FIG. 4, the part, specifically performing the suction function, of the suction apparatus is an air suction machine 501. The airflow in the suction chambers 704 flows through the suction ports 500a, and then converges to the air suction machine 501 through the suction manifold 504, such that the connection of the multiple suction ports 500a to the air suction machine 501 is facilitated, and the suction pipeline of the suction apparatus is also simplified.

Figure 8:
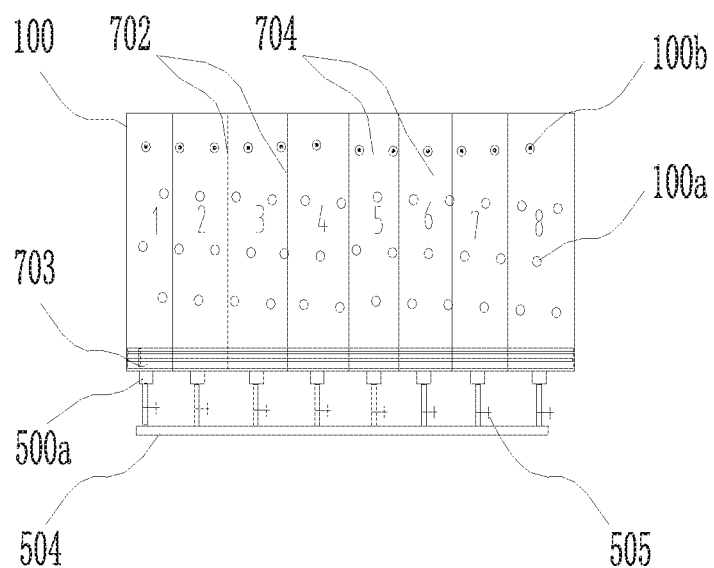
FIG. 8 is a schematic view showing that temperature sensing elements are provided in a circumferential wall of the tower in FIG. 5.
Figure 9:
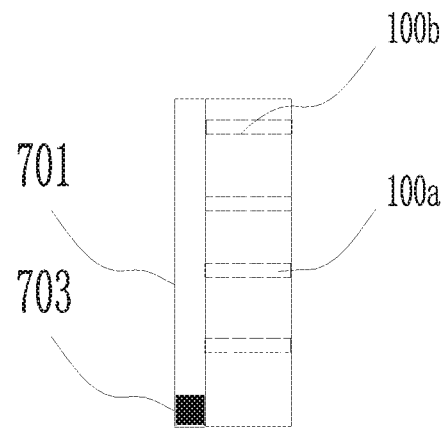
FIG. 9 is a side view of FIG. 8.
Figure 10:
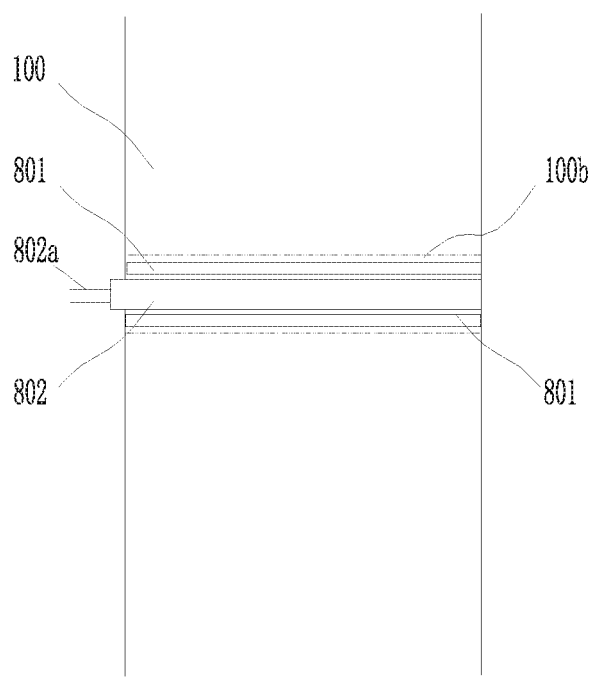
FIG. 10 is an enlarged view of the portion where the temperature sensing element is provided in FIG. 9.

With continued reference to FIGS. 8 to 10, FIG. 8 is a schematic view showing that temperature sensing elements 802 are provided in a circumferential wall of the tower in FIG. 5; FIG. 9 is a side view of FIG. 8; and FIG. 10 is an enlarged view of the portion where the temperature sensing element 802 is provided in FIG. 9.

The tower 100 may further be provided with several temperature sensing elements 802 distributed along the circumferential direction of the tower 100. The several temperature sensing elements 802 are configured to detect the temperature of the boundary layer airflow at the outer surface of the tower 100, to obtain the position of the bypass flow detachment. According to the phenomenon of the bypass flow detachment described above, at the position of the bypass flow detachment, counter flow occurs in the boundary layer and vortexes are formed, so that the normal flow in the boundary layer is destroyed, and the heat transfer coefficient at this position is the highest, therefore, the temperature is also relatively low. By detecting the temperature of the entire circumference of the tower 100, the position where the temperature is relatively low is just the position of the bypass flow detachment. Of course, due to the irradiation of sunlight, the temperature at the position of the bypass flow detachment on the shady side of the tower 100 is slightly lower, and the other position of the bypass flow detachment may just be determined according to the position with the slightly lower temperature and the position of the incoming flow at the upwind side. Specifically, the incoming flow at the upwind side and the windward side of the tower 100 form a stagnation point (an airflow stagnation point, which is a line from top to bottom on the windward side of the tower 100), the stagnation point and the positions of the bypass flow detachment at the two sides of the leeward side of the tower 100 constitute an isosceles triangle in the horizontal plane. Therefore, the other position of the bypass flow detachment can just be obtained with the assistance of the isosceles triangle relationship.

As shown in FIG. 7, when sunlight is irradiated from the due south, the temperature of the suction chamber 704 corresponding to the serial number 3 is slightly lower, and the temperature of the suction chamber 704 corresponding to the serial number 6 is actually slightly higher. The position of the bypass flow detachment at one side may be determined according to the suction chamber 704 corresponding to the serial number 3, and this position of the bypass flow detachment is at a certain angle with respect to the position directly facing the incoming flow at the upwind side. The position of the bypass flow detachment at the other side may just be obtained by rotating anticlockwise by the same angle from the position directly facing the incoming flow at the upwind side, that is, the suction chamber 704 corresponding to the series number 6.

The temperature sensing element 802 may output the detected temperature signal to the controller, and the controller judges and then determines the position of the bypass flow detachment, and then controls the suction apparatus to suction the corresponding suction chamber 704.

As shown in FIG. 10, a temperature sensing channel 100b may be provided in the peripheral wall of the tower 100, and the temperature sensing channel 100b also extends through the peripheral wall of the tower 100. An outer end, close to the outer surface of the tower 100, of the temperature sensing element 802 is configured to sense the temperature of the boundary layer at the outer surface of the tower 100. An inner end, close to the inner surface of the tower 100, of the temperature sensing element 802 is a lead end 802a and may output a signal to the controller. Of course, the temperature sensing element 802 may also output the signal wirelessly. The lead end 802 may extend out of the temperature sensing channel 100b to the inside of the tower 100 for ease of connection with the connecting line.

Such an arrangement is convenient for the temperature sensing element 802 to detect the temperature of the boundary layer airflow at the outer surface of the tower 100, and also facilitates the transmission of signals. The temperature sensing channel 100b can also provide a certain protection effect for the temperature sensing element 802. It can be understood that, due to the heat transfer, for a position, having a high heat exchange coefficient and a low temperature, of the outer surface, the temperature of the inner surface corresponding to this position is also slightly low, so it is also feasible to arrange the temperature sensing element 802 on the inner side of the tower 100 for detecting the temperature of the inner surface of the tower 100. Of course, comparatively speaking, the position of the bypass flow detachment can be more accurately determined by using the temperature sensing element 802 to detect the temperature of the boundary layer at the outer surface.

For the solution in which the temperature sensing element 802 is arranged inside the temperature sensing channel 100b in the peripheral wall of the tower 100 in FIG. 10, a thermal insulation layer 801 may be provided between the temperature sensing element 802 and the inner wall of the temperature sensing channel 100b, so as to prevent the sensed temperature from being interfered by the temperature of the peripheral wall of the tower 100 itself, and ensure that only the temperature at the outer surface of the tower 100 is measured. In addition, the temperature sensing element 802 may be arranged at a predetermined distance from an outer port of the temperature sensing channel 100b, and the predetermined distance may be 15 mm to 25 mm, that is, the temperature sensing element 802 may be retracted into the temperature sensing channel 100b by a certain distance, to allow it to accurately sense the temperature of the boundary layer at the outer surface without being affected by the radiation of sunlight.

In addition, an inner diameter of the temperature sensing channel 100b can be selected as 9 mm to 11 mm, in this way, it is advantageous to prevent the entrance of solar radiation and to avoid interference to the measurement of the temperature sensing element 502. Further, it can prevent rain water, dust and the like from entering the inside of the tower 100 through the temperature sensing channel 100b. An umbrella-like or mushroom head-like shield may be further provided at the outer port of the temperature sensing channel 100b.

Figure 11:
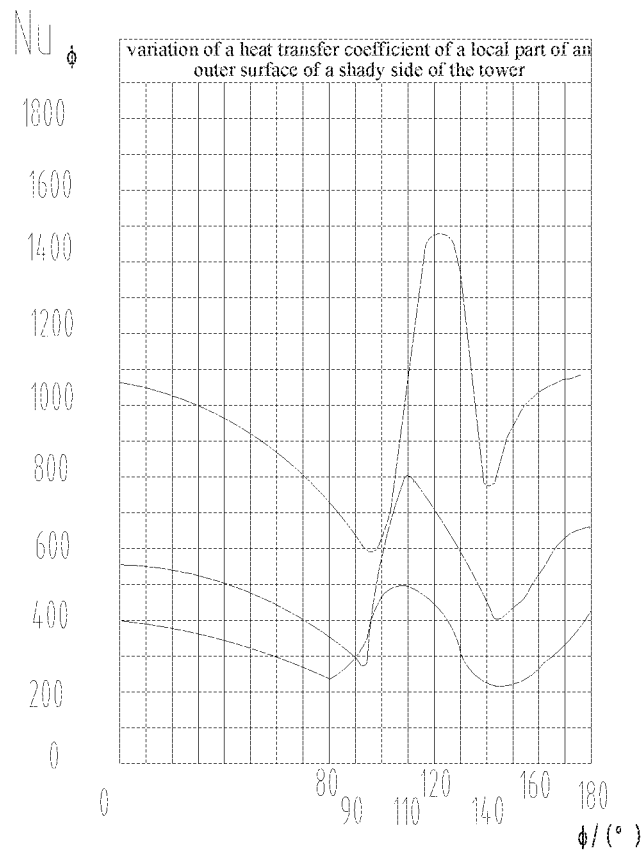
FIG. 11 is a graph showing the variation of Nusselt number Nu of a local surface of the tower as a function of an angle at three Reynolds numbers Re when airflow externally sweeps over the tower.

A method for obtaining the position of the bypass flow detachment according to the temperature detection is provided hereinabove. In addition to this, the position of the bypass flow detachment may also be obtained through the following methods. Referring to FIG. 11, FIG. 11 is a graph showing the variation of Nusselt number Nu of a local surface of the tower as a function of an angle at three Reynolds numbers Re when airflow externally sweeps over the tower.

A wind speed sensor, a wind direction sensor and a temperature sensor may be provided (according to the physical quantity involved with the Reynolds number), to measure the airflow temperature, to correct the viscosity coefficient and the density of the airflow, and thus obtaining the Reynolds number, and the position of the bypass flow detachment can be obtained through the Reynolds number. The vertical coordinate axis represents the Nusselt number Nu, which is a dimensionless number and indirectly reflects the magnitude of the surface heat transfer coefficient, and the horizontal coordinate axis represents an angle at which the normal vector of the contact surface, where the incoming flow at the upwind side is in contact with the wall surface of the tower, turns clockwise rightwards, and this angle is defined as $\phi/(°)$. The three continuous curves in the Figure from bottom to top represent three gradually increased Reynolds numbers respectively, and three peak values are approximately within a range from 110 degrees to 125 degrees, and are also gradually increasing correspondingly. Here, the angles corresponding to the three "peak values" are just at the position corresponding to back flow caused by the adverse pressure gradient of the bypass flow detachment, and at this position, the rate of heat exchange between the airflow and the outer wall of the tower is the highest.

Figure 12:
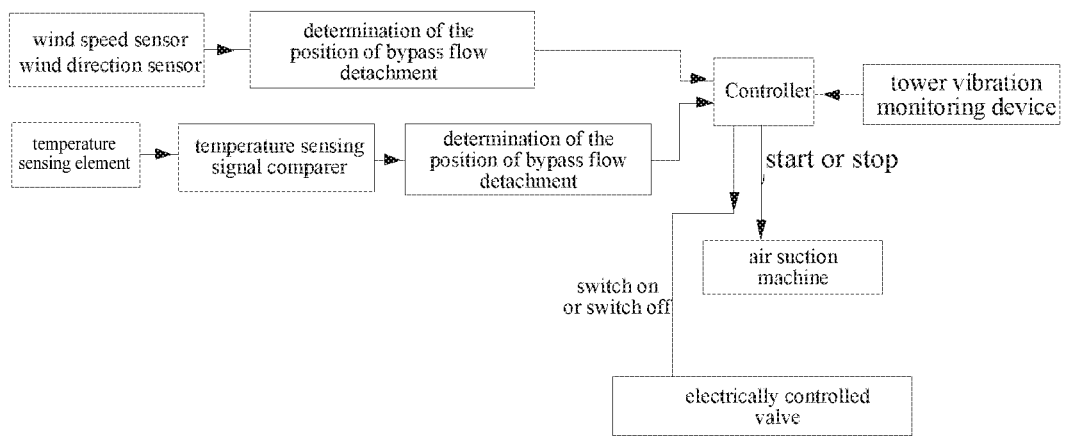
FIG. 12 is a control block diagram showing the suction to the suction cavity in FIG. 4.
Figure 13:
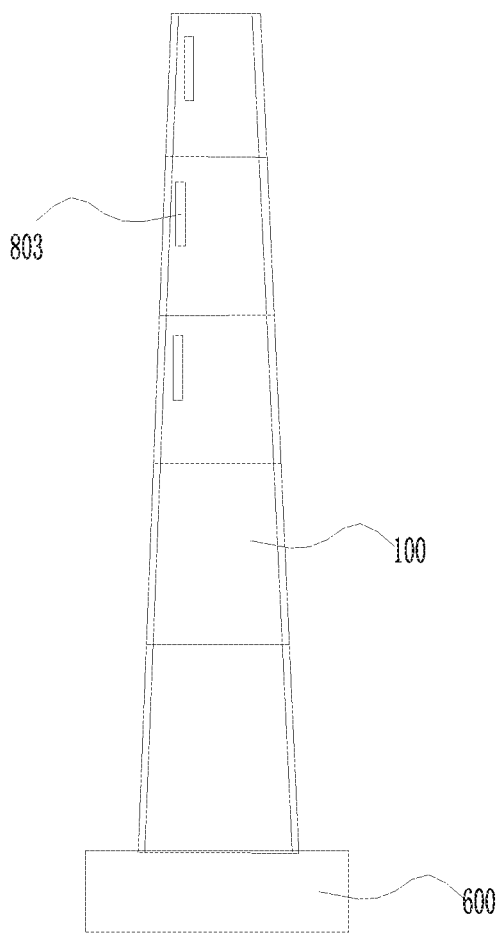
FIG. 13 is a schematic view showing that a vibration monitoring device is provided inside the tower.

Reference is made to FIGS. 12 and 13, FIG. 12 is a control block diagram showing the suction to the suction cavity in FIG. 4, and FIG. 13 is a schematic view showing that a vibration monitoring device 803 is provided inside the tower 100.

The methods for determining the position of the bypass flow detachment described above can be performed at the same time, so as to cross-check each other and be redundant solution for each other. Under normal circumstances, the positions of the bypass flow detachment obtained by the two methods should be the same or substantially the same. If the deviation between the two positions is too large, it may be caused by a failure of the temperature sensing element 802, or a failure of the wind direction sensor or the wind speed sensor. After the failed sensor is further determined, the actual position of the bypass flow detachment can be determined according to the data detected by the sensor not failed.

As shown in FIG. 12, the two methods for determining the position of the bypass flow detachment are performed at the same time, and the detected data and the determined results are fed back to the controller at the same time. In FIG. 12, the temperature signal of the temperature sensing element 802 is compared by the temperature sensing signal comparator to obtain the range of the position of the bypass flow detachment. Obviously, it is also feasible that the controller determines the range after receiving the data, or the temperature sensing signal comparator may be a unit module of the controller. According to the determined position of the bypass flow detachment, the controller outputs a control signal, to control the air suction machine 501 in the suction apparatus to be switched on, and control the electrically-controlled valve 505 of the suction chamber 704 corresponding to the position of the bypass flow detachment to be switched on to perform suction, and at the same time, control the electrically-controlled valves 505 of the rest suction chambers 704 to be switched off.

As shown in FIG. 13, a vibration monitoring device 803 may be provided inside the tower 100 to detect the vibration situation of the tower 100 and output a data signal of vibration (amplitude, frequency of vibration, and etc.) to the controller. The vibration monitoring device 803 may be arranged on the inner surface of the tower 100, or may be arranged, for example, inside the peripheral wall of the tower 100 or at other locations, and the solution of arranging the vibration monitoring device 803 on the inner surface of the tower 100 is simple and easy to implement. The controller adjusts the air suction machine 501 according to the feedback of the vibration monitoring device 803. In addition to performing the adjustments of switching on and switching off shown in FIG. 12, the controller may further control the frequency and voltage of the motor which drives the air suction machine 501, to implement voltage variation and frequency variation speed regulation to the motor, thereby achieving adjustment to the air suction flow rate of the air suction machine 501.

Adjusting the power of the air suction machine 501 may increase the air suction flow rate when the vibration is strong, and may reduce the air suction flow rate when the vibration is reduced. In addition, the distribution density of the suction through holes 100a and the bore diameter of the suction through holes 100a itself may affect the effect of air suction (the periphery of the outer surface of the suction through hole 100a and the inside of the hole may be in smooth transition). The power of the air suction machine 501 is adjustable, such that the arrangement of the suction through holes 100a may have a better flexibility. The suction through holes 100a may be sequentially arranged in the circumferential direction of the tower 100, and may also be arranged in a staggered manner.

In the environments of high altitude, at the top or hillside of a high mountain, when to install the wind power generator set and perform the task of hoisting the tower 100, the vibration state information obtained by the arranged vibration monitoring device 803 may be transmitted to the ground wirelessly, so that the on-site command personnel can master the information and carry out safe tower hoisting operations.

It should be noted that, in the above embodiments, the suction through holes 100a are provided only in the upper part of the tower 100. With such an arrangement, the further technical effects described as follows can be achieved.

Due to the presence of the suction through holes 100a which can be suctioned, the incoming flow at the upwind side is divided into different segments when flowing around the tower 100. When the incoming flow flows through a segment having the suction through holes 100a, the Reynolds number is substantially increased artificially. The incoming flow at the upwind side has an increased bypass flowing speed at this segment, and closely attaches the outer surface of the tower 100, without causing phenomena of boundary layer detachment and vortex street, which restricts the formation of vortexes at the two sides rearward of the upper part of the tower 100. When the incoming flow flows through the segment of the tower 100 having no suction through holes 100a, no assistance is received from suction, and the Reynolds number is not changed, and the flowing speed of the bypass airflow is low.

Therefore, in essence, the method of providing the suction through holes 100a in the local height segment thoroughly disturbs the situation that the frequencies of vortex shedding at the upper part and the lower part of the tower 100 are consistent in the conventional technology, thereby weakening their co-action, reducing or preventing the vortex-induced resonance response when the bypass flow detachment occurs in the boundary layer at the outer surface of the tower 100, and thus restricting or directly preventing the vortex-induced vibration at the upper part of the tower 100.

Correlation is an important feature of fluctuating wind, here it is related to the fluctuating wind speeds at two points $(Z_1, Z_2)$ in the space or the fluctuating pressures at two points at different heights on the surface of the tower 100.

The correlation coefficient $\rho$ is defined as $$\rho = \frac{\overline{u'(Z_1)u'(Z_2)}}{\sigma_u(Z_1)\sigma_u(Z_2)},$$

at the two different heights $(Z_1, Z_2)$, the covariance of the fluctuating wind speeds is defined as follows:

$$\overline{u'(Z_1)u'(Z_2)} = \frac{1}{T}\int_0^T [U(Z_1, t) - \overline{U}(Z_1)][U(Z_2, t) - \overline{U}(Z_2)]dt,$$

therefore, the covariance is the time average of the product of the fluctuating wind speeds at the two heights. The wind speed values at the right side of the equation have their respective average values $\overline{U}(Z_1)$ and $\overline{U}(Z_2)$ subtracted respectively.

In mathematics, the formula of standard deviation can be written as:

$$\sigma_u = \left\{\frac{1}{T}\int_0^T [U(t) - \overline{U}(Z)]dt\right\}^{\frac{1}{2}},$$

in the formula, U(t) represents a wind speed component in a direction of average wind speed, and is equal to $\overline{U}(Z)+u(t)$; and u(t) is a turbulence component in the downwind direction, that is, the fluctuating wind speed component in the direction of average wind speed.

The numerator indicates that wind speeds at two different heights of the tower 100 are different and represents the covariance of the fluctuating wind speeds.

The covariance is the time average of the product of the fluctuating wind speeds at the two heights.

The overall intensity of turbulence can be measured by root mean square or standard deviation of wind speeds, an average component is subtracted from each of the wind speeds, and then the remainders are quantified by deviations, the deviations are squared and then averaged, and a square root of the averaged value is extracted, to obtain a physical quantity having a wind speed unit, thus obtaining the standard deviation. According to the equation of definition of the correlation coefficient, the covariance of wind speeds at different heights is divided by the standard deviation to obtain the correlation coefficient between the two wind speeds at different heights. The smaller the correlation, the better. With a small correlation, the frequencies of vortexes at different heights after the vortexes are formed can be prevented from being consistent, and the accumulation and increasing of the vortex-induced resonance energy caused by the frequency consistency is destroyed, that is, preventing the growth of vortex-induced resonance, and even causing the vortex-induced resonance to disappear.

The mean square value of the total fluctuating wind force on the surface of the tower 100 structure is indicated as: $\overline{F'^2}=f[(\rho y_i - y_j]$, where, $y_i$, $y_j$ are two points in the vertical direction, and $\rho(y_i - y_j)$ is the correlation coefficient of the fluctuating wind force of each segment.

As can be seen from the above description, in the height direction, the peripheral wall of the tower 100 is provided with the segment having the suction through holes 100*a* and the segment having no suction through holes 100*a*, thereby destroying the correlation between the upper part and the lower part, and weakening or eliminating the vortex-induced vibration. However, the vortex-induced forces of a fluid-structure interaction at the outer surface of the tower 100 are not uniformly distributed in the height direction of the tower 100, and the energy of the vortex-induced force is more concentrated at the upper part of the tower 100, so it may just provide the suction through holes 100*a* in the upper part of the tower 100, which can not only reduce the damage caused by vibrations in a more targeted manner, but also break the correlation between the upper part and the lower part. Of course, it is feasible to provide the suction through holes 100*a* at positions other than the upper part of the tower 100 or provide the suction through holes 100*a* in multiple segments at different heights.

The embodiments described above can be further optimized.

As shown in FIG. 4, air discharge ports 500*b* of the suction apparatus may be located at the bottom within the tower 100, and reference is made to FIG. 14, which is a schematic view showing the airflow path of the discharged airflow in FIG. 4 after rising to the top of the tower.

In the case that the air discharge ports 500*b* are located at the bottom within the tower 100, the airflow discharged by the air discharge ports 500*b* may be continuously converged at the bottom of the tower 100 in a large quantity, thereby generating a positive pressure, and forming a positive pressure airflow, to push the air (hot airflow generated by electric equipment such as a high power converter or transformer) at the bottom of the tower 100 and in the tower 10 upward, and the pushing effect allows the hot airflow inside the tower 100 (a high power transformer, and various electric equipment are arranged inside the wind power generation device carrying enclosure, i.e., the tower 100, and all of these components generate electric energy loss in operation, and these losses are transformed into thermal energy which dissipates into the internal environment of the tower, to heat the air in the internal environment of the tower 100, thereby forming the hot air) to move entirely upwards at an accelerated speed (the hot airflow is subjected to the combined effect of its own rising force, the action of the air discharged from the air discharge ports 500*b* and the stack effect), and the hot airflow enters the hub via the generator 300 or the nacelle 200 at the top of the tower 100, and forms a positive pressure inside the hub, and then passes by the pitch servo motor 901 and the surface of the electric control cabinet 903 of the pitch servo system, to generate convective heat exchange, and produce a cooling effect.

At the same time, after exchanging heat, the airflow carrying heat is squeezed out from the root of the impeller 400, and in the process of being squeezed out, the airflow may in turn block rain or dust carried by the incoming flow at the upwind side from entering a flow guiding hood 902 (or entering the hub). This is equivalent to having a plugging function, which maintains a good sealed internal environment. When the airflow is squeezed out from the root of the impeller 400, the speed of the airflow may reach 0.5 m/s or so, and in the case of dust-containing airflow, the speed may increase to 1 m/s, this is sufficient to play the aforementioned plugging role without adversely affecting the impeller circumferential force applied by the incoming flow at the upwind side on the impeller 400.

The reason to mention the dust-containing airflow is as follows. In the wind farms lacking vegetation to cover the ground, such as wind farms in drought or desert areas, solid particles, including sand or dust, may be carried in the airflow, they may cause pollution when entering the hub at the root of the blades, may adversely affect the heat dissipation of the electric equipment, and adversely affect the lubrication life of bearings of shafting of rotating components. Therefore, it is necessary to find a solution to prevent the dust-containing airflow from entering the internal space of the hub. The conventional solution of providing sealing members can be hardly applied to this structure. However, the rising hot airflow utilized in this solution can exactly accomplish this function tactfully.

In view of this, after the airflow suctioned from the suction chamber is discharged from the bottom of the tower 100, it also functions to exchange heat with the pitch system and cool the pitch system and block the entering of foreign matters. For facilitating the discharged airflow rising up inside the tower 100 relatively uniformly, an air discharge manifold 503 may be provided. The air discharge manifold 503 is arranged in an annular shape, and is provided with the multiple air discharge ports 500*b* uniformly distributed circumferentially, thus, the airflow can be discharged uniformly in a larger region, and a transport pipeline 502 is formed between the air suction machine 501 and the air discharge manifold 500*b*. As shown in FIG. 4, the discharged airflow is converged at the bottom of the tower 100, rises upwards and then is squeezed to be discharged, thereby forming a path K.

In addition, the discharged airflow itself is the airflow suctioned from the suction cavity, that is, the air outside of the tower 100 suctioned from the suction through holes 100*a*, and the airflow is an airflow having a natural ambient temperature. In the process that the airflow is converged at the bottom of the tower 100 and pushed to rise upwards, the airflow functions to exchange heat with the heat generating equipment and elements inside the tower 100 and cool them, which is equivalent to introducing an external "cold source" to cool the inside of the tower 100, and squeezing out the hot air inside the tower 100. The solution in this embodiment is produced by the inventors who has considered the process of the impeller rotating to work passively from the perspective of the essence of the second law of thermodynamics (that is, the condition for the conversion from low-quality energy to high-quality energy, and the way to improve the quality of energy) for a long term, and is inspired by the concept of the second law of thermodynamics regarding the irreversible energy loss in the heat power reducing process.

It is mentioned above to filter the suctioned airflow, here, the filtered airflow may prevent, in the process of rising up, the foreign matters from damaging the components such as the nacelle 200 at the top of the tower 100 and the components inside the tower 100.

It can be seen that, according to this embodiment, the airflow at the boundary layer at the outer surface of the tower 100 is suctioned to the inside of the tower 10, which not only prevents the vortex-induced vibration caused by the detachment of the boundary layer, but also introduce the external air cold source to perform heat exchange and cooling. It may be understood that, the airflow suctioned by the suction apparatus may also not be discharged to the inside of the tower 100, but be discharged outside. Or it may be configured that the air discharge ports 500*b* can discharge air to the outside of the tower 100 and to the inside of the tower 100. In this way, when the outside airflow has a high temperature and cannot have a cooling effect, it can be discharged to the outside. Of course, in addition to the cooling effect, the effect of pushing out the hot airflow inside the tower 100 and the plugging effect formed by the positive-pressure airflow, are also factors that may be taken into consideration when choosing to discharge the airflow to the outside or the inside.

The suction apparatus may further be equipped with a dehumidifier to dehumidify the airflow suctioned from the suction through holes 100*a*, that is, to obtain dry airflow. When the dry airflow is inside the tower 100 or is squeezed to be discharged from the top of the tower 100, it may also avoid damaging other electrical elements.

The dehumidifier can be arranged to allow being bypassed, i.e., the airflow suctioned from the suction through holes 100*a* can be dehumidified by the dehumidifier when being discharged, and can also be directly discharged by bypassing the dehumidifier in a dry season or in a dry environment.

In the tower 100 with a vortex-induced vibration suppression function and the method for suppressing vortex-induced vibration according to the above embodiments, it is obvious that, compared with the method of using helix line mentioned in the background, the mode of performing suctioning to the suction through holes 100*a* to adsorb the boundary layer can directly suppress or prevent the cause of the vortex-induced vibration and has a better vibration suppression effect. In addition, the suction intensity may be adjusted any time according to the vibration state in suctioning, thus achieving a higher flexibility without requiring to pay a higher cost. Moreover, compared with the noise generated when the incoming flow at the upwind side comes into contact with the helix line in the background, the noise generated in performing suctioning to the suction through holes 100*a* may be obviously significantly smaller, and can meet the requirements of ecological regulations. Furthermore, the suctioning method can always realize its suppression function to the vortex-induced vibration in both the hoisting process or the operation process of the wind power generation set. With the suctioning method, functions of heat exchanging and cooling and plugging as described above may be achieved when the suctioned airflow is discharged towards the inside of the tower. The suctioned airflow may also have certain cooling and plugging functions even if it is not discharged from the bottom, it is just that if the suctioned airflow is discharged from the bottom, its rising and pushing effects can allow the cooling and plugging effects to be better.

All of the above embodiments are described by taking the tower 100 as an example, and it may be known that, the above embodiments can be applied to all the similar enclosures, for example, a television tower.

The above described embodiments are only preferred embodiments of the present application, and it should be noted that for the person skilled in the art, several improvements and modifications can be made without departing from the principle of the present application, and these improvements and modifications should also be deemed to fall into the scope of protection of the present application.

The invention claimed is:

1. An enclosure suppressing vortex-induced vibration, the enclosure comprising:
   suction through holes extending through a peripheral wall of an upper part of the enclosure, wherein the suction through holes are distributed in a circumferential direction of the enclosure;
   a suction apparatus configured to perform suction to the suction through holes from outside to inside of the enclosure, to restrain an airflow boundary layer at an outer surface of the enclosure from being detached from the outer surface; and
   a shell located inside the enclosure, wherein the shell and an inner surface of the upper part of the enclosure form a closed annular suction cavity,
      wherein the suction apparatus is configured to perform suction to the suction through holes from outside to inside of the enclosure by performing suction to the suction cavity; and
      partitions are further provided in the suction cavity, and the partitions divide the suction cavity into a plurality of circumferentially distributed suction chambers; an incoming flow at an upwind side forms a bypass flow detachment when flowing around the enclosure, and the suction apparatus is configured to suction only the suction chamber corresponding to a position of the bypass flow detachment.

2. The enclosure according to claim 1, wherein an air filtration segment is provided between the suction cavity and a suction port of the suction apparatus.

3. The enclosure according to claim 1, wherein the suction apparatus has a plurality of suction ports corresponding to the plurality of suction chambers respectively, and a switch valve is provided between each of the suction ports and the respective suction chamber; and when suctioning the suction chamber corresponding to the position of the bypass flow detachment, the switch valves corresponding to rest of the suction chambers are switched off.

4. The enclosure according to claim 3, wherein the suction apparatus comprises a suction manifold and an air suction machine, and the suction ports are each in communication with the air suction machine via the suction manifold.

5. The enclosure according to claim 3, wherein the enclosure is further provided with a plurality of temperature sensors distributed in the circumferential direction of the enclosure to detect a temperature of the boundary layer at the outer surface of the enclosure, to obtain the position of the bypass flow detachment.

6. The enclosure according to claim 5, wherein the enclosure is provided with temperature sensing channels extending through the peripheral wall of the enclosure, and the temperature sensors are arranged in the respective temperature sensing channels.

7. The enclosure according to claim 6, wherein a thermal insulation layer is provided between each of the temperature sensors and an inner wall of the respective temperature sensing channel, and the temperature sensor is arranged at a predetermined distance from an outer port of the temperature sensing channel.

8. The according to claim 5, wherein the enclosure further comprises a wind speed sensor and a wind direction sensor for obtaining the position of the bypass flow detachment, and the switch valves are electrically controlled valves; and the enclosure further comprises an electronic controller; and the electronic controller is configured to determine an actual position of the bypass flow detachment according to a position of the bypass flow detachment obtained by the temperature sensor and a position of the bypass flow detachment obtained by the wind speed sensor and the wind direction sensor; and control the suction apparatus to be switched on, and at the same time switch on the electrically controlled valve corresponding to the actual position of the bypass flow detachment and switch off the rest of the electrically controlled valves.

9. The enclosure according to claim 1, wherein the suction through holes are provided only in an upper part of the enclosure.

10. The enclosure according to claim 1, wherein air discharge ports of the suction apparatus are located at a bottom of the enclosure within the enclosure.

11. The enclosure according to claim 10, wherein the suction apparatus comprises an annular air discharge manifold, and an airflow suctioned by the suction apparatus is configured to be discharged via the air discharge manifold.

12. The enclosure according to claim 10, wherein the suction apparatus comprises a dehumidifier configured to dehumidify an airflow suctioned from the suction through holes.

13. The enclosure according to claim 1, wherein the enclosure is a tower of a wind power generation device.

14. A method for suppressing vortex-induced vibration of an enclosure, comprising:
providing suction through holes extending through a peripheral wall of an upper part of the enclosure, wherein the suction through holes are distributed in a circumferential direction of the enclosure;
providing a shell inside the enclosure, wherein the shell and an inner surface of the upper part of the enclosure form a closed annular suction cavity; and
performing suction to the suction through holes from outside to inside of the enclosure by performing suction to the suction cavity, to restrain an airflow boundary layer at an outer surface of the enclosure from being detached from the outer surface, and in a case that an incoming flow at an upwind side forms a bypass flow detachment when flowing around the enclosure, only performing suctioning to the suction through hole corresponding to a position of the bypass flow detachment.

15. The method for suppressing vortex-induced vibration of the enclosure according to claim 14, comprising: detecting a temperature of the boundary layer at the outer surface of the enclosure in the circumferential direction of the enclosure, to obtain the position of the bypass flow detachment.

16. The method for suppressing vortex-induced vibration of the enclosure according to claim 15, comprising: detecting a wind speed and a wind direction of an environment where the enclosure is located, to obtain the position of the bypass flow detachment, and cross-checking the position of the bypass flow detachment obtained according to the wind speed and the wind direction with the position of the bypass flow detachment obtained according to the temperature of the boundary layer, to determine an actual position of the bypass flow detachment.

17. The method for suppressing vortex-induced vibration of the enclosure according to claim 14, comprising: discharging a suctioned airflow to a bottom of the enclosure within the enclosure.

* * * * *